United States Patent [19]

Iden

[11] Patent Number: 5,993,163
[45] Date of Patent: Nov. 30, 1999

[54] DEMAND SYSTEM FOR PNEUMATIC SOURCE WITH CONTROLLER RESPONSIVE TO BYPASS AIR FLOW RATE

[75] Inventor: Steven M. Iden, Belvidere, Ill.

[73] Assignee: Trilectron Industries, Inc., Palmetto, Fla.

[21] Appl. No.: 08/938,623

[22] Filed: Oct. 1, 1997

Related U.S. Application Data

[60] Provisional application No. 60/027,539, Oct. 7, 1996.

[51] Int. Cl.$^6$ .................................................. F04B 49/02
[52] U.S. Cl. ........................... 417/43; 417/18; 417/34; 417/53; 60/39.142
[58] Field of Search ......................... 60/39.142, 270.1, 60/39.141; 417/43, 18, 34, 53

[56] References Cited

U.S. PATENT DOCUMENTS

| | | |
|---|---|---|
| 4,384,818 | 5/1983 | Blotenberg .................................. 415/1 |
| 4,936,740 | 6/1990 | Blotenberg ................................. 415/27 |

FOREIGN PATENT DOCUMENTS

| | | |
|---|---|---|
| 0 352 469 | 1/1990 | European Pat. Off. . |
| 0 473 530 | 3/1992 | European Pat. Off. . |
| 27 39 229 | 3/1979 | Germany . |
| 1 186 827 | 10/1985 | U.S.S.R. . |
| WO 91 07712 | 5/1991 | WIPO . |

OTHER PUBLICATIONS

Stewart & Stevenson Services, Inc. "Aircraft Ground Support Equipment," CAM DOC 236–001, Rev. Dec. 1988, pp. 1–1–4 through 1–1–10, 1–2–10.
Stewart & Stevenson Services, Inc. "Aircraft Ground Support Equipment," CD267 ES7484, Rev. May 1 1991, pp. 1–1–5 through 1–1–10.

*Primary Examiner*—Timothy S. Thorpe
*Assistant Examiner*—Ehud Gartenberg

[57] ABSTRACT

A demand system is disclosed for controlling the output airflow from a pneumatic source in response to changes in airflow demand. The source includes a pressure sensitive bypass mechanism in fluid communication with a discharge manifold to divert unwanted airflow and a linear electronic limiter with a limiter signal input to control the pneumatic source and proportionally adjust output airflow into the discharge manifold. The demand system includes an airflow detector operative to produce a linear output signal proportional to the airflow through the bypass mechanism and a controller. The controller includes an input connected to the airflow detector and an output connected to the electronic limiter input and operative, as the airflow detector senses airflow through the bypass mechanism, to produce a linear output signal representative of the airflow to the limiter for altering the pneumatic source output.

32 Claims, 3 Drawing Sheets

DEMAND SYSTEM FOR PNEUMATIC SOURCE WITH CONTROLLER RESPONSIVE TO BYPASS AIR FLOW RATE

This application claims benefit of Provisional Application Ser. No. 60/027,539 filed Oct. 7, 1996.

BACKGROUND OF THE INVENTION

This invention relates to a demand system for use with pneumatic sources and more particularly an electronic demand system for controlling the airflow from a pneumatic source linearly in response to changes in airflow demand.

In order to compete successfully in the airline industry, airline operators must minimize the expenses and departure delays included in maintaining and servicing its equipment. These factors have a major impact on operators because jet aircraft require virtually constant attention to operate reliably and safely. Thus, in order to survive in the marketplace, aircraft operators must depend upon reliable and cost effective aircraft servicing units whenever possible.

An example of the servicing regularly required for jet aircraft includes start-up of the jet engines. Pneumatic sources, including systems commonly referred to as air start units, conveniently couple to the aircraft and provide pneumatic power for actuating a pneumatic start system built into the jet engine which, in turn, drives and starts the engine. Air start units also typically double as auxiliary sources of air conditioning power for the aircraft while on the ground.

Because of stringent safety requirements for jet aircraft, air start systems must have the capability of providing variable airflow to the aircraft through a service hose connected to a discharge manifold at a substantially constant pressure. This generally requires a pneumatic control system for reliable pressure regulation of the air start unit. Damage to the aircraft can occur if the pressure is not sufficiently well regulated.

One conventional configuration for an air start unit having a pneumatic control system includes a compressor driven by a diesel engine and having an output directed into a discharge manifold. The compressor engine includes a mechanical governor for controlling its speed, and consequently, compressor output airflow. A bypass control valve is plumbed into the side of the discharge manifold to sense the discharge pressure for comparison with a regulated reference pressure. A differential in the discharge and reference pressures causes the bypass valve to either vent off excess pressure, or close to build up pressure within the manifold.

To assist the bypass valve in reducing or increasing pressure as needed in the manifold, the above unit incorporates a mechanical demand control system for varying the compressor engine speed. The system comprises first and second pneumatic actuators having respective pressure inputs communicating with the manifold and control pressure line respectively. Variations in the manifold pressure cause a proportional forward or rearward displacement of the first actuator to mechanically alter the engine throttle linkage. The second actuator is kept at a relatively constant level to maintain a minimum engine idle level.

Another conventional air start unit design incorporates a small pneumatic valve that attaches to the large bypass valve to control the throttle linkage of the engine. During operation, mechanical movement in the main bypass valve translates to direct mechanical movement of the small pneumatic valve via a mechanical linkage to either reduce or increase the pneumatic pressure to a single pneumatic actuator on the throttle.

While the conventional configurations described above work well for their intended purposes, several problems result from the use and operation of the associated demand systems. First and foremost are the system's inherent mechanical nature that necessitate precise adjustments and servicing to maintain satisfactory operation. Those skilled in the art have realized the complexity of such demand systems and often must invest substantial amounts of time and money in specialized mechanic training programs to maintain the units in operating condition. Another problem involves the relatively poor response characteristics of the demand systems that often cause the respective bypass valves to "hunt" for the proper level of closure to stabilize the manifold pressure. Lastly, mechanical demand systems that interface with mechanical governors are often incompatible for use with modern diesel engines incorporating electronic control governors to meet stringent emissions control regulations.

A further proposal to solve many of the aforementioned problems, marketed by the assignee of the present invention, includes many of the same features of the first proposal. However, instead of relying upon complex mechanical systems, the proposal instead incorporates a switch in the bypass valve to detect a threshold level of valve travel. The amount of valve travel indirectly indicates the presence of diverted airflow through the bypass. The switch output is fed back to an electronic governor in the compressor engine to step the engine output up or down according to predetermined set threshold levels. Because of the electrical characteristics of the feedback switch, the second proposal is easily implemented in modern diesel engine designs requiring electrical inputs for control of the electronic governor. However, the stepped threshold nature of the switch fails to adequately address the response problems typically associated with the mechanical based systems. Additionally, reliable operability of the switch often requires regular adjustments and specialized training.

Thus, those skilled in the art have recognized the need for an improved demand system for use with a pneumatic source to interface with modern diesel-powered compressors and provide reliable, straightforward, and relatively maintenance-free operation. The demand system of the present invention satisfies this need.

SUMMARY OF THE INVENTION

The system and method of the present invention provides reliable, straightforward and relatively maintenance-free airflow control for air starter operation in a variety of jet engine servicing modes necessitating variable airflow from a regulated pressure manifold. Maintenance costs of air start units employing the demand system and method of the present invention are reduced because of the electronic nature of the invention and the omission of mechanical moving parts that tend to fatigue and fall out of adjustment. Additionally, the improved response characteristics realized by the present invention minimize the potential hazards relating to over-pressurization of the aircraft pneumatics, and consequently reduce aircraft departure delays.

To realize the advantages described above, the apparatus of the present invention comprises an electrical demand system for use with a pneumatic source to produce airflow at a predetermined pressure into an output discharge manifold. In one embodiment, the source includes pressure sensitive bypass means in fluid communication with the manifold to divert unwanted airflow and a linear electronic limiter with a limiter signal input to control the pneumatic source and proportionally adjust output airflow into the discharge manifold. The demand system includes an airflow detector mounted proximate the bypass means and operative to produce a linear output signal proportional to the airflow through the bypass means, and a controller having an input connected to the airflow detector and an output connected to the electronic limiter input and operative, as the airflow detector senses airflow through the bypass means, to produce a linear output signal representative of the airflow to the limiter for altering the pneumatic source output and thus the output airflow.

The method of the present invention controls airflow produced by a pneumatic source having an output governed by an electronic limiter for delivery to a jet engine at a predetermined pressure through a discharge manifold. The manifold is coupled in fluid communication to a pressure sensitive bypass means for diverting unwanted airflow from the manifold when the predetermined pressure is exceeded. The method includes the steps of detecting the diverted airflow through the bypass means, generating a linear signal and feeding the linear signal back to the limiter input to indicate a reduction in airflow demand and correspondingly alter the airflow output from the pneumatic source.

BRIEF DESCRIPTION OF THE DRAWINGS

The above and other features of the present invention may be more fully understood from the following detailed description, taken together with the accompanying drawings, wherein similar reference characters refer to similar elements throughout and in which.

DESCRIPTION OF THE PREFERRED EMBODIMENTS

Air start units offer airline operators a convenient pneumatic source for providing a variety of functions related to aircraft servicing. Applicable functions typically involve jet engine starting and aircraft air conditioning. While different applications are available for air starters, common to air starter functionality during the different modes of use is the selectability of the rate at which air is delivered to the aircraft and regulation of the pressure of delivered air.

The critical requirement for most air start units is the capability of regulating the delivery pressure in the discharge manifold 28, typically 40 PSIG for jet start mode, or 25 PSIG for air conditioning mode. The aircraft pilot monitors the delivery pressure to ensure that the aircraft pneumatics are not overpressurized. Any unexpected oscillations in delivery pressure detected by the pilot during jet start or air conditioning mode often results in immediate abort of the procedure with a potential stand-down of the air start unit and the aircraft itself. Thus, to minimize maintenance costs and departure delays, reliable regulation must be maintained.

Figure 1:
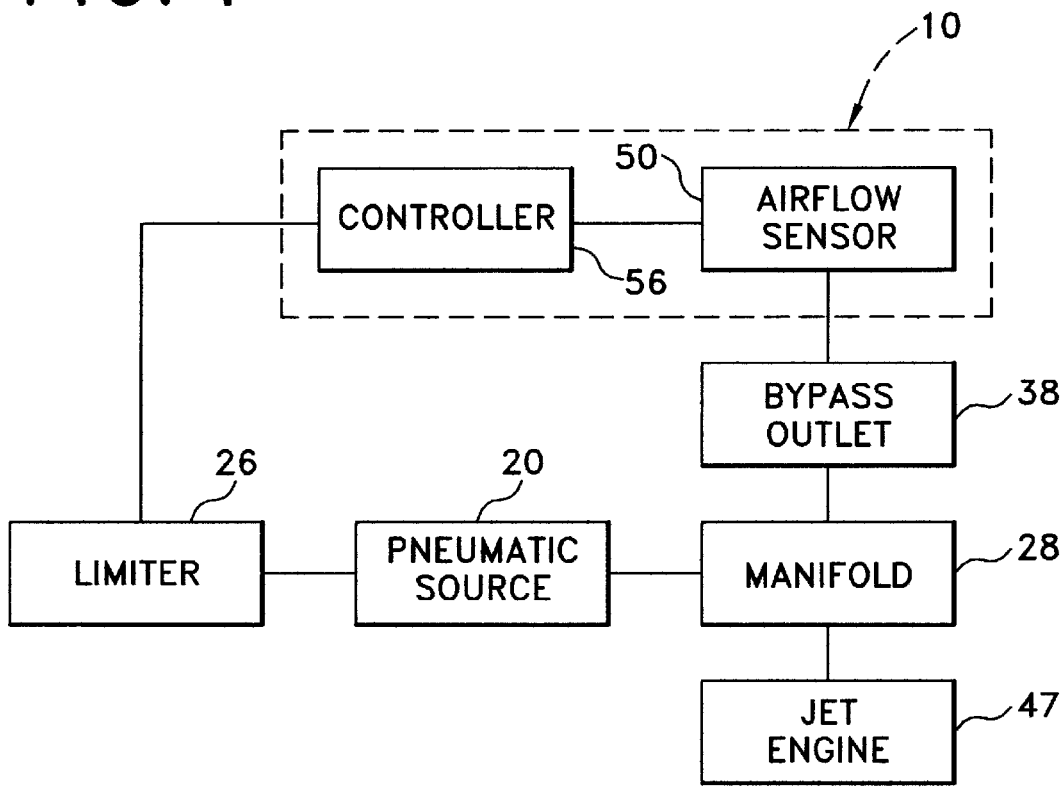
FIG. 1 is a block diagram of the demand system of the present invention.

As shown for purposes of illustration in FIG. 1, the demand system of the present invention, generally designated 10, is typically used with a pneumatic source 20 that detects pressure changes in a discharge manifold 28 represented by unwanted airflow diverted through a bypass 38. An airflow sensor 50 and controller 56 provide linear feedback indicative of the bypass airflow to a limiter 26 on the pneumatic source. The limiter controls the output of the pneumatic source to modify the manifold pressure substantially proportional to the unwanted airflow sensed in the bypass.

Figure 2:
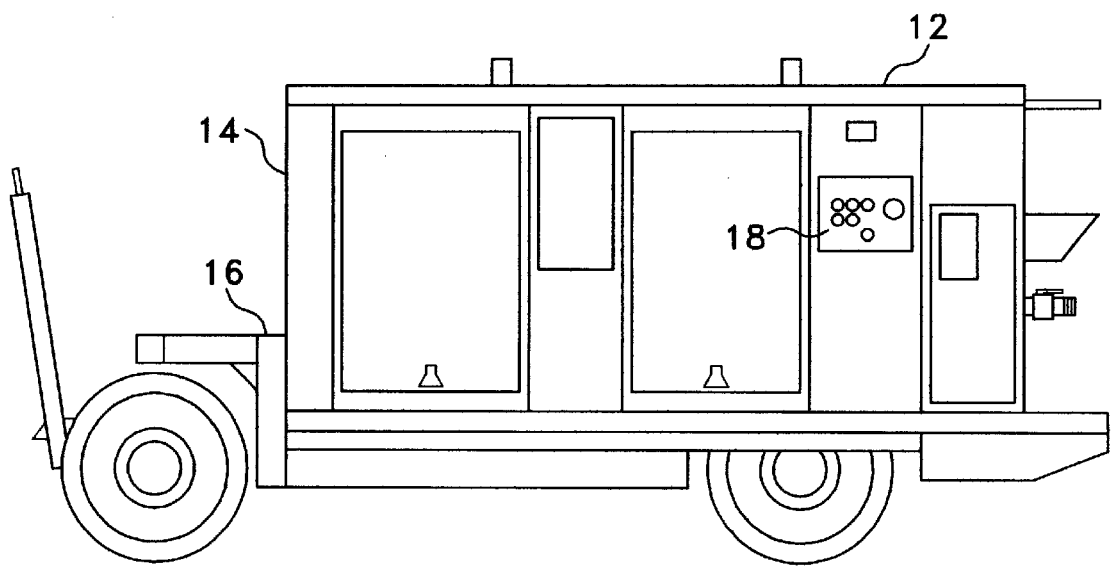
FIG. 2 is a side elevational view of an air starter constructed according to one specific embodiment of the system and method of the present invention and mounted upon a mobile trailer.

Referring now to FIG. 2, air starter units 12 are typically mounted within a noise abating enclosure 14 to minimize the noise decibel level generated during operation of such units. The enclosure mounts to the support surface of a mobile chassis 16 comprising a trailer or a motorized vehicle and usually includes an accessible operator interface panel 18 providing easy access to important pressure gauges and switches. In this configuration, an aircraft maintenance crew can quickly set the air starter in position adjacent a jet engine for aircraft servicing, and, when finished, immediately retreat therefrom.

Figure 3:
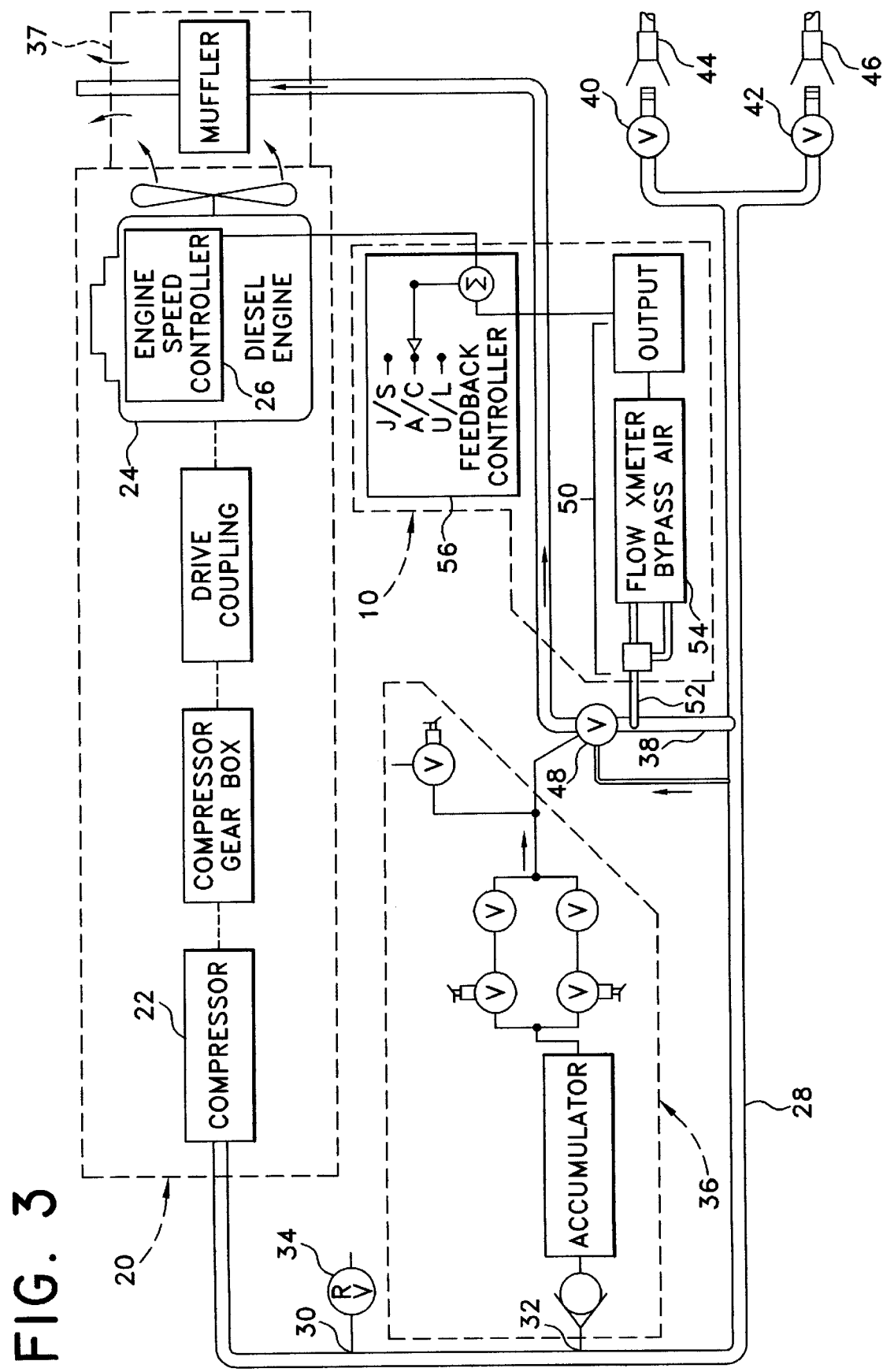
FIG. 3 is a detailed schematic of an air starter unit employing another specific embodiment of the demand system of the present invention.

As shown in FIG. 3, and in accordance with one embodiment of the present invention, air start units generally include a pneumatic source 20, such as a compressor, for generating the necessary airflow to start an engine or power aircraft air conditioning. The pneumatic source typically comprises a positive displacement compressor 22 of sufficient size to produce satisfactory airflow on the order of 180 to 300 pounds/minute. A motor 24 drives the compressor, and in accordance with one particular embodiment, comprises an emissions controlled diesel engine manufactured by Detroit Diesel, Model No. 8V92TA. The motor includes a factory installed electronic limiter or governor 26 responsive to electrical inputs to control throttling. Because of the positive displacement nature of the compressor, changes in motor output produce substantially proportional changes in compressor output airflow.

Further referring to FIG. 3, the compressor output connects to and feeds a discharge manifold 28. Formed intermediate the manifold are respective access ports 30 and 32 for plumbing a failsafe pressure relief valve 34 and a reference pressure regulator circuit 36. Unwanted airflow may be diverted through a bypass outlet 38 that projects laterally from the manifold. The distal end of the manifold branches into a forked configuration and mounts respective air delivery ball valves 40 and 42 to engage respective pneumatic couplings 44 and 46 disposed at the end of respective outlet hoses (not shown) for attachment to the jet engine 47 (FIG. 1). The respective ball valves include a unique bleed mechanism that bleeds air out of the main pneumatic feeder hose, which connects to the aircraft when the ball valve is closed.

The bypass outlet 38, as shown with continued reference to FIG. 3, terminates in a bypass control valve 48 designed with a pressure sensitive diaphragm (not shown) having one side exposed to pressure in the manifold 28, and the other side in communication with a regulated reference pressure produced by the reference pressure regulator circuit 36.

The outlet from the bypass control valve terminates in a bypass air muffler 37 located in a plenum (not shown). This plenum is proximate the engine's radiator plenum (not shown) and is somewhat disposed in fluid communication with the radiator plenum. This limited fluid contact allows the cooler radiator air to carry heat away from the skin of the muffler, allowing a lower operating temperature for the muffler. Further, respective exhaust louvers (not shown) for both plenums are disposed proximate exhaust air from both sources (radiator and bypass air). This results in a lowering of the average temperature and velocity of the exhaust which corresponds to quieter and cooler operation.

In some embodiments, the dirty exhaust gases from the diesel engine are also injected into the exhaust airstream. This has the effect of reducing the dark exhaust cloud normally associated with diesel engines.

Figure 4:
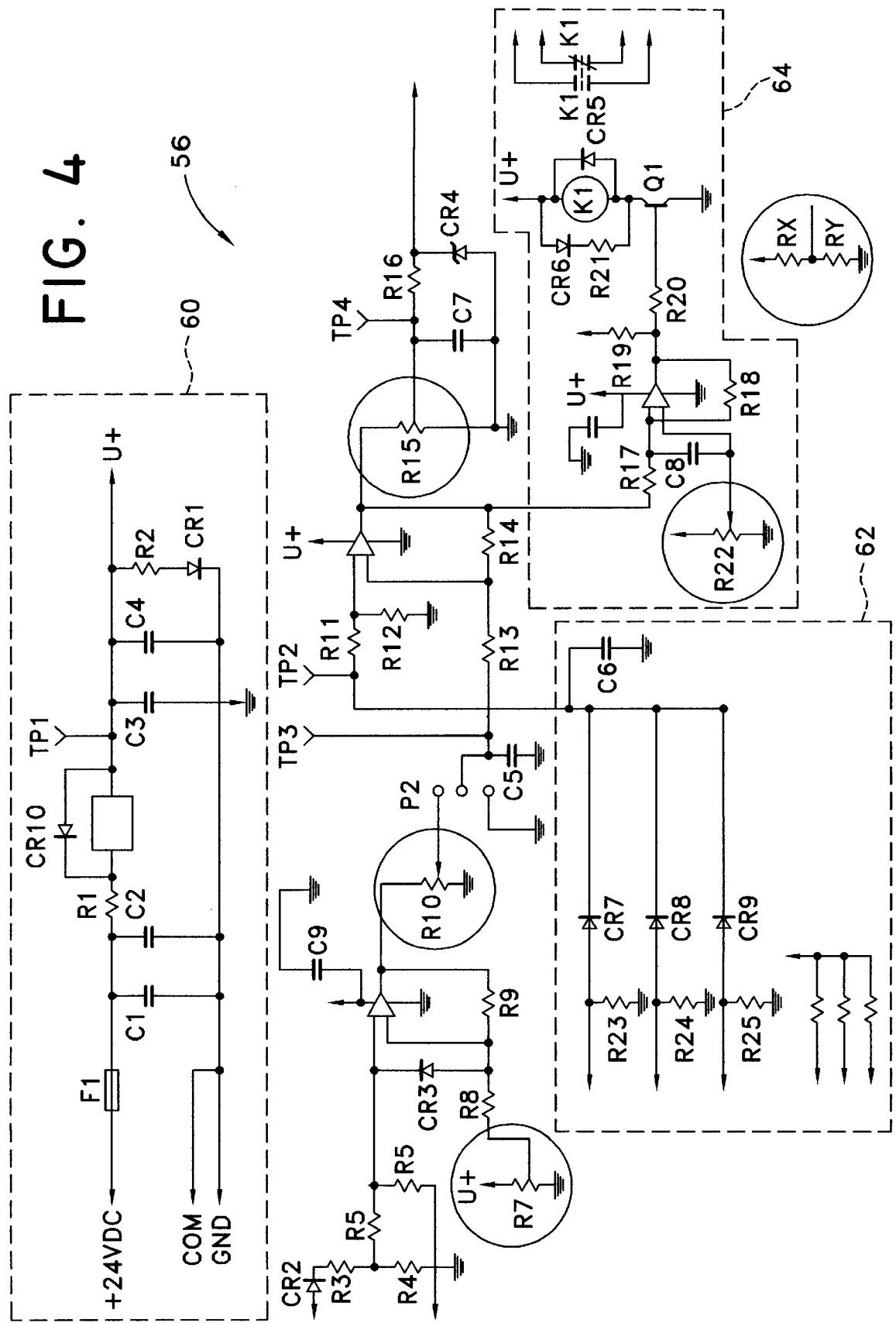
FIG. 4 is a detailed schematic of a preferred embodiment of the demand system controller.

Referring to FIGS. 1, 3 and 4, one embodiment of the demand system 10 of the present invention includes an airflow sensor 50 and controller 56 to provide a linear feedback signal representative of airflow diverted through the bypass outlet 38. The inventor has discovered that sensing the flow rate of air through the bypass conduit produces a more reliable and quantifiable feedback characteristic as compared to, for example, a single direct measurement of pressure in the manifold 28.

The airflow sensor 50, in accordance with one embodiment of the present invention, includes a pitot tube 52 positioned inside the bypass outlet 38 with the tube open end directed upstream into the expected diverted airflow. The respective pressures at the opposite ends of the tube are monitored by a differential pressure transducer 54 that produces a linear output signal proportional to the difference between the two tube pressures. The inventor envisions that other sensing schemes may be employed to detect airflow through the bypass such as an orificed venturi means or a pneumatic flowmeter means.

With continuing reference to FIGS. 3 and 4, the output of the differential pressure transducer 54 is fed to the signal input of a feedback controller 56. The controller includes a plurality of switching inputs for detecting the air start mode of operation so that the airflow signal may be appropriately conditioned into a quantified linear output throttle command signal for the pneumatic source limiter 26. The controller 56 typically includes a rack mountable enclosure (not shown) that protects an internally mounted printed circuit board (not shown) that supports and mounts the controller electronic circuitry.

Referring now to FIG. 4, the controller circuit includes on/off DC power transforming means 60 comprising transformer U3 and shunting diode CR10 to step down a 24 volt external power source to approximately 5 volts to power the circuit electronics. Capacitors C1, C2, C3 and C4 cooperate with resistors R1 and R2 to minimize circuit exposure to harmful on/off voltage transients or spikes.

The signal input to the controller circuit comprises "bypass flow" LED CR2 in series with load resistors R3 and R4. Input current from transducer 54 on the order of 4–20 milliamperes turns the LED on and causes a voltage drop across R3 of 1 to 5 volts. This voltage is sensed by buffer amplifier U1, which is biased by resistors R5, R6, R8 and potentiometer R7. Potentiometer R7 provides a "deadband" adjustment for setting the minimal threshold of feedback required to produce a responsive signal to the governor or limiter 26. Potentiometer R10 and optional jumper P2 provide troubleshooting access and adjustment to this part of the circuit. The output of U1 is then sensed by the inverting input of operational amplifier U2, which serves as an output buffer to the engine governor electronics. Resistors R11, R12, R13 and R14 bias the amplifier U2, with R13 and R14 providing negative feedback to maintain unity gain.

Conditioning of the buffer amplifier U1 output signal to the input of U2 is accomplished through an "or" network 62 that provides the controller with an indication of the air start unit mode of operation. As discussed earlier, the engine speed and corresponding compressor airflow is typically different during different modes. The compensation network includes a plurality of voltage dividers R23/R26, R24/R27, and R28/R25 (shown unconnected for purposes of clarity) having respective inputs tied to a mode selector switch (not shown) on the operator interface panel 18. The "conditioning" voltage is then fed to the noninverting input of operational amplifier U2 and cooperates with the voltage sensed at the inverting terminal to produce a conditioned resultant output. The conditioned output signal is then fed through potentiometer R15 and a low impedance RC network R16 and C7 to the governor input.

The controller circuit also includes an override 64 to eliminate various parameter redlines, or threshold parameter measurements, during jet start operation. This ensures that the air start unit operates to start the jet engine after hook-up, even if trouble occurs in the air start unit that would normally cause the unit to shut down. The override senses the output signal from U2 with amplifier U4, which is configured with resistors R17 and R18 to give the amplifier a predetermined gain of approximately 20. Gain may be adjusted through potentiometer R22. Resistors R19 and R20, connected as a current dividing network, drop the output current of U4 by approximately 10 to drive Q1. As Q1 turns on, it draws current through the coil of relay K1, turning "safety bypass" LED CR6 on, and altering the respective states of the respective normally open and normally closed relay K1 contacts. Once the override circuit activates, engine monitoring of such parameters as engine speed, oil pressure, temperature and the like discontinues until circuit deactivation.

Assembly and setup of one embodiment of an air start unit 12 incorporating the demand system 10 of the present invention generally involves a one time linear calibration of the pneumatic source limiter 26 with respect to the demand system. In such an embodiment, the "zero", or minimum signal output from the demand controller typically corresponds to the minimum pneumatic source output, and the maximum demand controller signal corresponds to the maximum source output. Linear changes in the control signal then produce corresponding linear changes in the pneumatic source output. The airflow sensor 50 is conveniently factory calibrated and often requires no more than mere routine inspection as maintenance. Because of the electronic nature of the demand system 10, those skilled in the art will appreciate the minimal maintenance required for long term reliable operability.

Operation of the air start unit 12 incorporating the demand system 10 of the present invention provides the necessary reliable regulation of delivery pressure to an aircraft with the added benefit of minimal maintenance. Use of the unit on a regular basis after initial set-up begins by hooking up respective ends of respective air start outlet hoses (not shown) to respective discharge manifold ball valves 40 and 42 for subsequent connection to respective jet engine pneumatic couplings 44 and 46. The operator then selects the appropriate mode of operation on the operator interface panel 18 (FIG. 2). Typical modes include jet engine start, air conditioning, and unload modes. The significance of providing different mode capabilities resides in the different airflow demands required by the aircraft at different times. For example, starting a jet engine generally requires airflow delivery from the air start unit up to 250 pounds per minute at a delivery pressure of 40 PSIG. Air conditioning mode, however, often requires a substantially lower airflow at a reduced delivery pressure of, for example, 25 PSIG. Thus, the appropriate selection on the operator interface is fed to the demand controller 56 for appropriate conditioning of the demand feedback signal that, in turn, controls the limiter 26 for throttling the engine appropriately.

Following selection of the appropriate mode, the operator then initiates operation of the unit 12 by depressing an appropriate ignition switch that starts the motor 24. The engine operates at a preselected speed as set by the limiter 26 to drive the compressor 22 and generate a predetermined airflow into the discharge manifold 28. At this point, the outlet hoses to the aircraft are typically closed, and the airflow demand is thus zero. Initial airflow introduced into the manifold causes the pressure therein to increase quickly to the desired delivery level. However, because the outlets are closed, the airflow must vent or the manifold will overpressurize. Once the delivery pressure is exceeded, the pressure sensitive bypass valve 48 opens to vent airflow from the manifold, thus reducing manifold pressure until the desired delivery pressure again stabilizes. Those skilled in the art will understand the operation of the bypass valve in conjunction with the reference regulator circuit 36 as shown in the drawings, and thus no further explanation is needed.

The demand system 10 of the present invention assists the bypass valve 48 in controlling airflow through the manifold by linearly regulating the compressor output as a function of the aircraft airflow demand. A combination of bypassing unwanted airflow and reducing compressor output works well to quickly control delivery pressure. As diverted airflow passes through the bypass outlet 38, the airflow sensor 50 positioned within the outlet detects the level of diverted airflow and produces a proportional output signal to the demand system controller 56. The controller then determines the present operating mode, and produces an output signal to the engine limiter 26 to reduce engine speed, and output airflow.

Following the initial start of the system, and after minimal iterations of the demand system control loop, the manifold pressure reaches an equilibrium with the dynamic airflow entering the manifold 28. Once the manifold pressurizes to the desired delivery pressure, the aircraft pilot, endeavoring to start the jet engine, opens the air delivery ball valves 40 and 42 to pressurize the aircraft pneumatics to the desired delivery pressure. Once this occurs, indicating full aircraft demand, the desired manifold pressure will drop slightly. This pressure drop causes the bypass valve to close somewhat and decrease venting until the delivery pressure again reaches the desired level. As a result, airflow through the bypass decreases thereby causing a proportional linear decrease in the airflow sensor output. The controller then processes a corresponding output signal to the engine limiter 26, indicating full demand, to correspondingly increase engine speed and cause a linear increase in airflow to meet the demand and consequently maintain the delivery pressure.

Once the jet engine starts, the pilot closes the outlets, again tending to overpressurize the manifold. As explained above, the bypass valve 48 combines with the demand system 10 to reduce the manifold pressure and obtain the earlier described equilibrium. Typically, after the jet has started, the air start operator selects the unload mode to fully bypass the compressor airflow. In this mode, the demand system 10 directs the engine limiter to reduce the engine to idle. In this manner, not only are engine fuel costs reduced, but ambient noise resulting from high speed engine operation is also reduced.

Following a successful jet engine start, the air start unit is disconnected from the aircraft. The unique bleed feature incorporated in the respective ball valves 40 and 46 prevents the feeder hose from being pressurized when the ball valves are closed thereby making disconnection from the aircraft easier.

The description set forth above addresses operation of an air start unit 12 using the demand system 10 of the present invention in jet start mode. However, it should be understood that operation in air conditioning mode is substantially similar, albeit under lower operating pressures and flow.

While one embodiment of the demand system of the present invention has been described in conjunction with airflow through the bypass valve as an indicator of aircraft demand, those skilled in the art will appreciate that the method of the present invention, as set forth in the aforedescribed operation of the demand system 10, can be used to monitor airflow exiting the manifold outlet. In such circumstances, bypass airflow is still detected, albeit indirectly as a function of outlet airflow. Consequently, such a configuration involves positioning the airflow sensor at the manifold outlet, and pre-setting the engine limiter to idle, with airflow detection causing linear proportional increases in engine speed to produce additional compressor airflow.

Those skilled in the art will appreciate the minimal level of maintenance required to operate a pneumatic source, or air start unit, incorporating the demand system 10 of the present invention. Because the airflow sensor 50 and associated controller 56 employ virtually no moving parts, component failure and associated repair is minimized. Additionally, the straightforward design, with factory calibrated instrumentation, ensures reliable predictability and a high level of stable response with little to no adjustments necessary. Thus, aircraft operators are able to avoid the costly specialized training typically associated with complex adjustments typically required of conventional demand systems used in typical air start units.

While minimal maintenance is an important advantage associated with the present invention, another benefit involves the reduction in costs associated with untimely departure delays resulting from inadequate aircraft servicing. Observed oscillations in air start delivery pressure by the aircraft pilot often result in aborts or re-starts of the servicing procedure. In extreme circumstances, and in the interests of caution, the aircraft may have to stand down for inspection of the onboard pneumatic system to verify an absence of damage. The improved response characteristics of air start units that employ the demand system of the present invention avoid such costly delays.

The demand system of the present invention also helps to reduce stand down time of the air start unit itself. A costly problem often experienced by conventional air starters involves the replacement of the failsafe pressure relief valve 34. Replacement is often due to overuse that results from slow response of the bypass/demand system resulting in overpressurization in the manifold sufficient to blow the relief valve. Satisfactory relief valves for application in air start units typically cost six hundred dollars or more because of the volume of airflow involved. The design of the demand system of the present invention provides improved response characteristics such that relief valve actuation rarely results.

While the preferred embodiments have been described and illustrated, various substitutions and modifications may be made thereto without departing from the spirit and scope of the invention. Accordingly, it is to be understood that the present invention has been described by way of illustration and not limitation.

What is claimed is:

1. A demand system for controlling the output airflow from a pneumatic source in response to changes in airflow demand, said source including a pressure sensitive bypass mechanism in fluid communication with a discharge manifold to divert unwanted airflow and a linear electronic limiter with a limiter signal input to control the pneumatic source and proportionally adjust output airflow into the discharge manifold, said system including:

an airflow detector operative to produce a linear output signal proportional to the airflow through said bypass mechanism; and a controller having an input connected to said airflow detector and an output connected to said electronic limiter input and operative, as said airflow detector senses airflow through said bypass mechanism, to produce a linear output signal representative of the airflow to said limiter for altering said pneumatic source output.

2. A demand system according to claim 1 wherein:
said airflow detector is mounted proximate said bypass mechanism to directly sense the level of output airflow.

3. A demand system according to claim 1 wherein:
said airflow detector is mounted in said discharge manifold to indirectly sense changes in delivery pressure resulting from diverted airflow through said bypass mechanism.

4. A demand system according to claim 1 wherein:
said detector comprises a pitot tube having respective ends and mounted in said bypass outlet and having a differential pressure transducer disposed at each end of said tube to sense the relative pressures at said respective ends.

5. A demand system according to claim 1 wherein:
said detector comprises an orificed venturi.

6. A demand system according to claim 1 wherein:
said detector comprises a pneumatic flowmeter.

7. A demand system according to claim 1 wherein said controller includes;

an input interface to receive detector signal inputs;

a power transformer to supply controller power; and a signal conditioner disposed downstream of said input interface to provide an indication of a predetermined mode of operation.

8. A demand system according to claim 7 wherein:
said power transformer includes a potentiometer for establishing a deadband minimal threshold.

9. A demand system according to claim 7 wherein:
said signal conditioner includes a compensation network comprising a plurality of voltage dividers to provide said mode indication.

10. A demand system according to claim 1 and further including:

a redline monitoring mechanism to track measurements of predetermined parameters and effect cutoff of unit operation should one or more selected measurements fall outside of a pre-programmed band of values.

11. A demand system according to claim 10 and further including:

an override mechanism to disable said redline monitoring mechanism after a predetermined period of operation of said unit.

12. An air starter unit for delivering a controllable airflow to a jet aircraft, said unit including:

a housing;

a pneumatic source enclosed within said housing for generating said airflow;

a discharge manifold disposed at the output of said pneumatic source to direct said generated airflow, said manifold formed with a bypass mechanism to divert flow from said manifold according to a selected demand, and an airflow outlet for connecting to said aircraft; and a demand system including an airflow detector operative to produce a linear output signal proportional to said diverted flow through said bypass mechanism, and a controller having an input connected to said airflow detector and an output fed back to said pneumatic source and operative, as said airflow detector senses diverted flow through said bypass mechanism, to produce a linear output signal representative of the airflow to said source for altering said delivered source airflow.

13. An air starter unit according to claim 12 wherein:
said pneumatic source comprises a positive displacement air compressor.

14. An air starter unit according to claim 13 wherein:
said air compressor includes a motor for driving said compressor and having an electronic limiter responsive to feedback input signals to control the airflow output of said compressor; and said controller output is connected to said electronic limiter input to provide indicative feedback of flow diverted through said bypass mechanism to control said airflow.

15. An air starter unit according to claim 12 wherein:
said discharge manifold includes a failsafe relief valve and a reference pressure regulator circuit for establishing a regulated reference pressure.

16. An air starter unit according to claim 15 wherein:
said bypass mechanism includes a bypass outlet terminating in a bypass control valve, said control valve including a pressure sensitive diaphragm having a first side exposed to pressure in said manifold, and a second side disposed in fluid communication with a regulated reference pressure produced by said reference pressure regulator circuit.

17. An air starter unit according to claim 12 wherein:
said airflow detector is mounted proximate said bypass mechanism to directly sense the level of output airflow.

18. An air starter unit according to claim 12 wherein:
said airflow detector is mounted in said discharge manifold to indirectly sense changes in delivery pressure resulting from diverted airflow through said bypass mechanism.

19. An air starter unit according to claim 12 wherein:
said detector comprises a pitot tube having respective ends and mounted in said bypass outlet and having a differential pressure transducer disposed at each end of said tube to sense the relative pressures at said respective ends.

20. An air starter unit according to claim 12 wherein:
said detector comprises an orificed venturi.

21. An air starter unit according to claim 12 wherein:
said detector comprises a pneumatic flowmeter.

22. An air starter unit according to claim 12 wherein said controller includes:

an input interface to receive detector signal inputs;

a power transformer to supply controller power; and a signal conditioner disposed downstream of said input interface to provide an indication of a predetermined mode of operation.

23. An air starter unit according to claim 22 wherein:
said power transformer includes a potentiometer for establishing a deadband minimal threshold.

24. An air starter unit according to claim 22 wherein:
said signal conditioner includes a compensation network comprising a plurality of voltage dividers to provide said mode indication.

25. An air starter unit according to claim 12 and further including:
a redline monitoring mechanism to track measurements of predetermined parameters and effect cutoff of unit operation should one or more selected measurements fall outside of a pre-programmed band of values.

26. An air starter unit according to claim 25 and further including:
an override mechanism to disable said redline monitoring mechanism after a predetermined period of operation of said unit.

27. An air starter unit according to claim 12 and further including:
a mobile chassis disposed beneath said starter unit for transporting said unit.

28. A method of controlling airflow produced by a pneumatic source having an output governed by an electronic limiter for delivery to a jet engine at a predetermined pressure through a discharge manifold, said manifold coupled in fluid communication to a pressure sensitive bypass mechanism for diverting unwanted airflow from said manifold upon exceeding said predetermined pressure, said method including the steps of:
detecting said diverted airflow through said bypass mechanism;
generating a linear signal proportional to said detected diverted airflow; and
feeding said linear signal back to said limiter input to indicate a reduction in airflow demand and correspondingly alter said airflow output from said pneumatic source.

29. A method according to claim 28 wherein said detecting step includes the steps of:
selecting an airflow detector for mounting proximate said bypass mechanism; and
directly sensing the flow diverted through said bypass mechanism with said airflow detector.

30. A method according to claim 28 wherein said detecting step includes the steps of:
selecting an airflow detector for mounting in said discharge manifold; and
indirectly sensing the flow diverted through said bypass mechanism with said airflow detector.

31. A method according to claim 28 and further including the steps of:
establishing a plurality of measurements of predetermined operating parameters;
determining threshold redline operating limits for said predetermined operating parameters; and
monitoring said redline limits, when one or more limits are exceeded, to cut operation of said unit.

32. A method according to claim 31 and further including the step of:
overriding said step of monitoring after operation of said unit over a predetermined duration.

* * * * *